US012326235B1

(12) United States Patent
Zheng

(10) Patent No.: US 12,326,235 B1
(45) Date of Patent: Jun. 10, 2025

(54) SPLICED LIGHTING FIXTURE

(71) Applicant: JOININ GLOBAL PTE. LTD., Singapore (SG)

(72) Inventor: Hongbing Zheng, Singapore (SG)

(73) Assignee: JOININ GLOBAL PTE. LTD., Singapore (SG)

( * ) Notice: Subject to any disclaimer, the term of this patent is extended or adjusted under 35 U.S.C. 154(b) by 0 days.

(21) Appl. No.: 18/904,928

(22) Filed: Oct. 2, 2024

(30) Foreign Application Priority Data

Sep. 12, 2024 (CN) ........................ 202422236223.X

(51) Int. Cl.
*F21S 8/04* (2006.01)
*F21V 21/03* (2006.01)
*F21V 33/00* (2006.01)

(52) U.S. Cl.
CPC ............... *F21S 8/046* (2013.01); *F21S 8/043* (2013.01); *F21V 21/03* (2013.01); *F21V 33/0096* (2013.01)

(58) Field of Classification Search
CPC ...... F21V 21/03; F21V 33/0096; F21S 8/043; F21S 8/046; F21Y 2103/33
See application file for complete search history.

(56) References Cited

U.S. PATENT DOCUMENTS

2008/0213094 A1* 9/2008 Okimura ............... F04D 25/088 416/5
2015/0285451 A1* 10/2015 Luo ........................... F21V 1/00 362/96
2022/0128066 A1* 4/2022 Huang ................ F21V 33/0096
2023/0097560 A1* 3/2023 Chang ................. F21V 33/0096 416/204 R

FOREIGN PATENT DOCUMENTS

CN 109027835 A * 12/2018
CN 111878430 A * 11/2020 ........... F04D 25/088

* cited by examiner

*Primary Examiner* — Alexander K Garlen
(74) *Attorney, Agent, or Firm* — Schwegman Lundberg & Woessner, P.A.

(57) ABSTRACT

A spliced lighting fixture has a mounting base and at least two luminous modules. Each of the at least two luminous modules includes a luminous frame unit and a connecting rod, and the luminous frame unit is spliced on the mounting base through a terminal of the connecting rod. All of luminous frame units are arranged in multi-segment arcs on a concentric circle. All of the luminous frame units are connected end to end to form a circle, so that all of the luminous frame units form a whole annular luminous frame. The luminous frame unit includes a luminous frame unit bracket, an arcuate housing which is matched and connected with the luminous frame unit bracket, and luminous members which are arranged in the arcuate housing and distributed at intervals. The spliced lighting fixture is composed of two or more luminous modules spliced together.

6 Claims, 3 Drawing Sheets

SPLICED LIGHTING FIXTURE

CROSS REFERENCE TO THE RELATED APPLICATIONS

This Non-provisional application claims priority under 35 U.S.C. § 119 (a) to Chinese Patent Application No. CN202422236223.X filed on Sep. 12, 2024, the entire content of which is hereby incorporated by reference.

TECHNICAL FIELD

The disclosure relates to a lighting fixture and a fan lamp, in particular to a spliced lighting fixture.

BACKGROUND ART

A fan lamp is an electrical appliance that combines functions of a chandelier and a ceiling fan. Besides basic functions such as lighting and ventilation, most of fan lamps have a decorative function, and there are two types of fan lamps, namely, a traditional straight-blade fan lamp and a blade-hidden fan lamp, in the market.

Illuminants of existing fan lamps generally adopt an integrated molded housing, which is easy to deform, and have a wide and thick light-emitting surface, and an integrated all-plastic fan lamp presents a large volume, high packaging cost and high transportation cost.

For example, an existing modular fan lamp is of a structure which generally includes: a volute, a fan assembly, a diffusion device, an air inlet, an air outlet, an air outlet channel and a lighting assembly. The fan assembly includes a motor and an operation wheel. The diffusion device includes a bearing wall for installing the fan assembly and a first diffusion mechanism positioned at one side of the bearing wall and circumferentially arranged around the operation wheel. The air outlet channel is enclosed by the volute and the diffusion device. A light diffusion plate of the lighting assembly is fully covered over the other side of the bearing wall. The air outlet is arranged at a periphery of the lighting assembly, and an orthographic projection of the lighting assembly on a light-emitting surface does not exceed a maximum boundary of an orthographic projection of the air outlet. In this fan lamp, the light diffusion plate is fully covered over the other side of the bearing wall, the air outlet is arranged at the periphery of the lighting assembly, and the orthographic projection of the lighting assembly on the light-emitting surface does not exceed the maximum boundary of an orthographic projection of the air outlet, so that a ratio of a luminous area of the fan lamp is improved and a luminous flux is improved. With this technology, it can be seen that modularization in related art still stays at a level of simplified installation, but a structure of an actual product is still large, which is not convenient for transportation. Moreover, it can seen from the specific technical scheme that its lamp and fan interact with each other. Due to existence of the lamp, a ventilation hole of the fan can only operate in an annular air outlet manner in a circumferential direction of the lamp and its air inlet hole is small, which shows that a fan function of this technology is largely weakened.

SUMMARY

An object of the disclosure is to solve problems that light-emitting parts of existing lamps and fan lamps are not modularized so that they cannot be disassembled and transported and are inconvenient to install, and functions of fans and lamps affect each other.

The disclosure adopts following technical schemes.

A spliced lighting fixture includes a mounting base and at least two luminous modules. Each of the at least two luminous modules includes a luminous frame unit and a connecting rod, and the luminous frame unit is spliced on the mounting base through a terminal of the connecting rod.

With modular design, no mutual influence between the fans and a lamp set can be realized.

A controller which can be fixed to an upper surface of a motor is provided above the motor, and both the motor and the luminous frame unit are connected to the controller, and the controller is an 89C51 single chip microcomputer.

Further, all of luminous frame units are arranged in multi-segment arcs on a concentric circle.

Further, all of the luminous frame units are connected end to end to form a circle, so that all of the luminous frame units form a whole annular luminous frame.

An installation space for the fan is provided, and the whole annular luminous frame can be formed in combination with matching and connecting of all of the luminous frame units. The mounting base is designed and arranged above a center of the whole luminous frame, and thus it can be seen that the annular space is all reserved for the fan, and functions of the fan and the luminous frame units are not influenced by each other.

Further, the luminous frame unit includes a luminous frame unit bracket, an arcuate housing which is matched and connected with the luminous frame unit bracket, and luminous members which are arranged in the arcuate housing and distributed at intervals.

The arcuate housing adopts a polycarbonate arcuate housing, and the mounting base adopts a polycarbonate mounting base. Polycarbonate is PC plastic and a transparent material, with low cost and high light transmittance.

The arcuate housing is long in its length extension direction, with a width of 12 to 18 mm and a thickness of 22 to 28 mm.

Further, all of the luminous frame units have a same size and are evenly spaced and distributed on a same circumference.

A new way to realize the arcuate housing is provided, which on one hand can save cost, and meanwhile, for different demands, the arcuate housing can be designed differently. For example, for demand for brighter illumination in a living room, design with a general length can be adopted, and for demand for softer illumination in a bedroom or study room, a length of the arcuate housing can be reduced, so that a number of light sources and thus illumination intensity can be reduced.

Further, a number of the connecting rods is N, the mounting base is provided with N first clamping structures, and a terminal of each of the connecting rods is respectively provided with a second clamping structure, and a respective first clamping structure is buckled to the second clamping structure, so that the luminous frame unit is spliced on the mounting base.

Further, the mounting base is provided with a bottom groove, the first clamping structure is provided at an upper end of a circumferential side wall of the bottom groove, the first clamping structure includes a connecting groove for the second clamping structure to be inserted from top to bottom, and at least one first clamping part which extends upwards and can be inserted into and clamped with a self-contained jack of the second clamping structure is arranged in the connecting groove.

With this design, translation of the luminous frame unit in a circumferential direction is fixed, and overall stability of the structure is improved.

Further, the mounting base is further provided with a fan module, and fan blades of the fan module are located in a space enclosed by the luminous modules.

Because the lamp set is designed in a ring shape, the installation space for the fan is reserved, so that the lamp set does not interfere with a fanning space of the fan. As viewed from a plane, the lamp set and the fan do not overlap with each other, and thus the fan does not shield the light sources. Therefore, it can be seen that the fan and the lamp set have realized their own functional independence. From an electrical point of view, the motor and the luminous frame unit are connected to a same controller due to a fact that functions of the motor and the luminous frame unit are simple and the motor and the luminous frame unit also can be controlled by the same controller, and thus only one remote controller is adopted for remotely controlling the same controller, which not only saves cost, but also causes follow-up operations to be simpler and more convenient.

Further, a motor of the fan module is built in and fixed at a center of the bottom groove of the mounting base, a screw faces a light-emitting surface, and the fan blades are installed on the screw of the motor.

Compared with the related art, the disclosure has following advantages.

1. The lighting fixture of this disclosure is designed in a modular manner, which is composed of two or more luminous modules spliced together, so that a single module is not easy to deform.
2. The lighting fixture of the disclosure is modularized, simple to assemble, and adopts a frame structure, thus with better heat dissipation and guaranteed service life.
3. The luminous frame unit of the disclosure can be designed with a discontinuous structure, so that the number of the light sources can be designed differently according to different requirements, and lighting environments with different brightness can be obtained.
4. The fan lamp can be assembled and disassembled in a modular manner, which simplifies and reduces packaging and facilitates transportation.
5. The arcuate housing has a narrow and thin light-emitting surface, which increases light intensity and has a simple and beautiful appearance.

DETAILED DESCRIPTION

Figure 1:
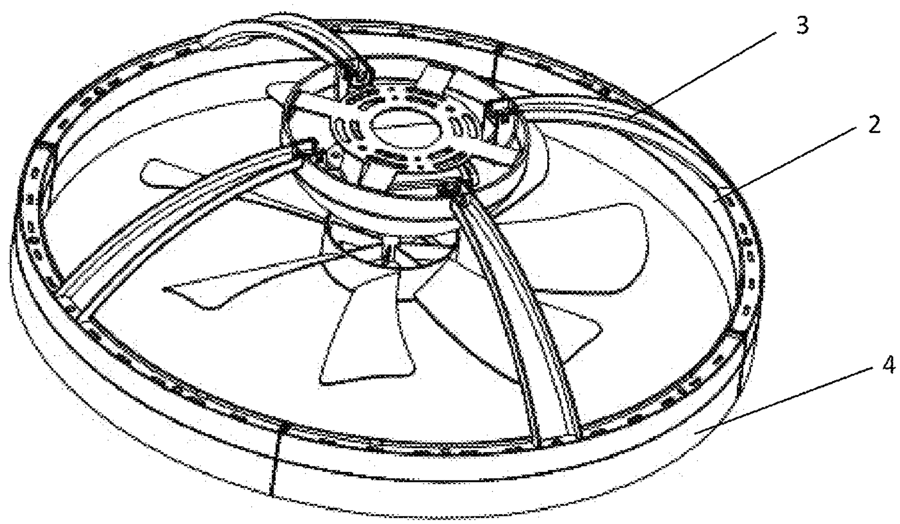
FIG. 1 is a schematic structural view of the disclosure.
Figure 2:
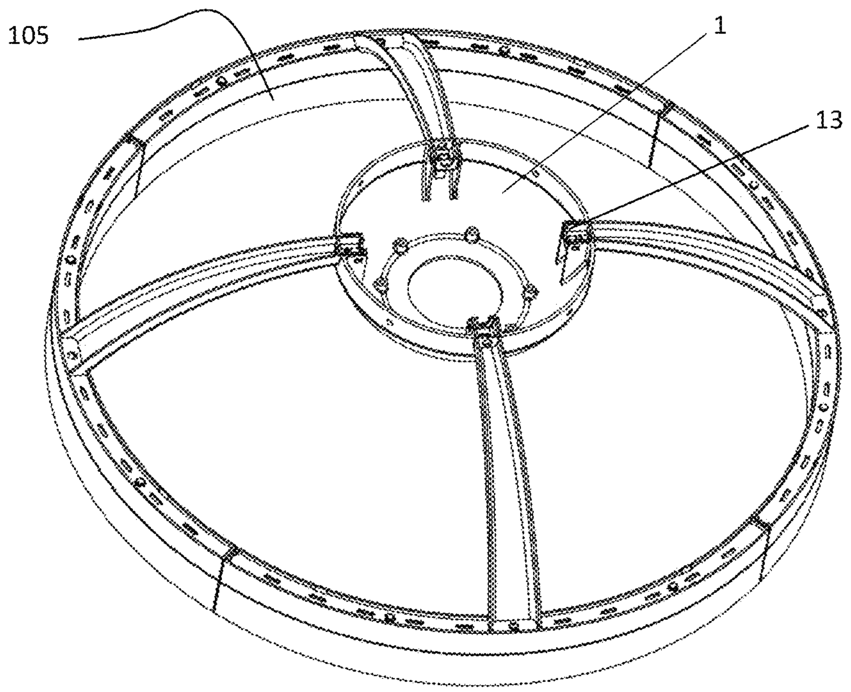
FIG. 2 is a schematic structural view of the disclosure without a fan module installed.
Figure 3:
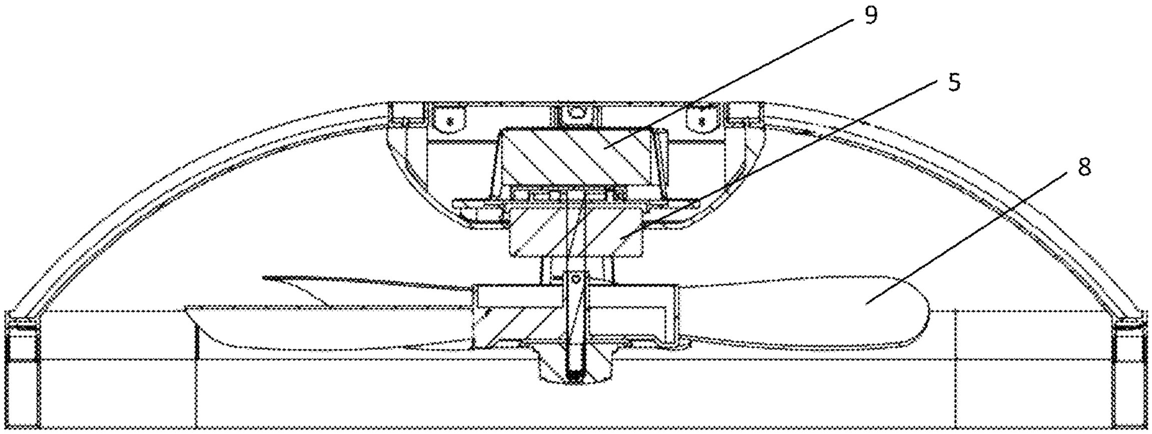
FIG. 3 is a schematic view of a sectional structure of the disclosure.
Figure 4:
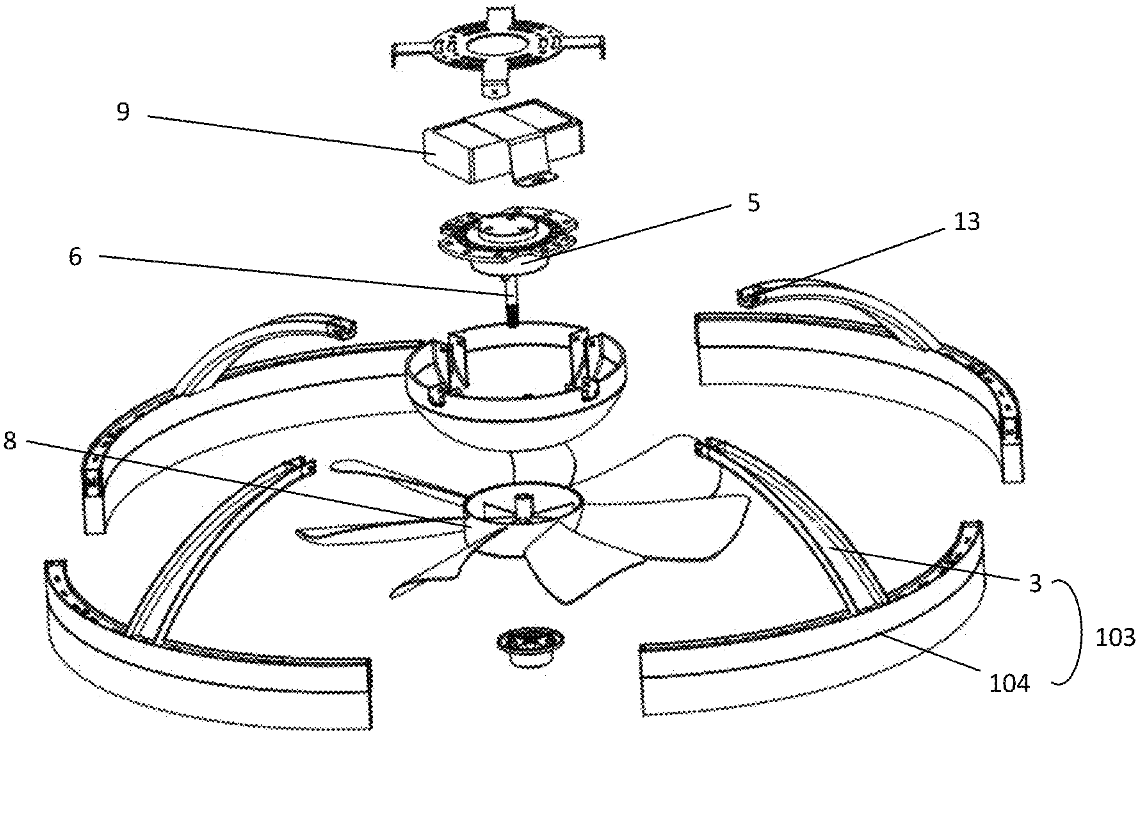
FIG. 4 is a schematic view of an exploded structure of the disclosure.
Figure 5:
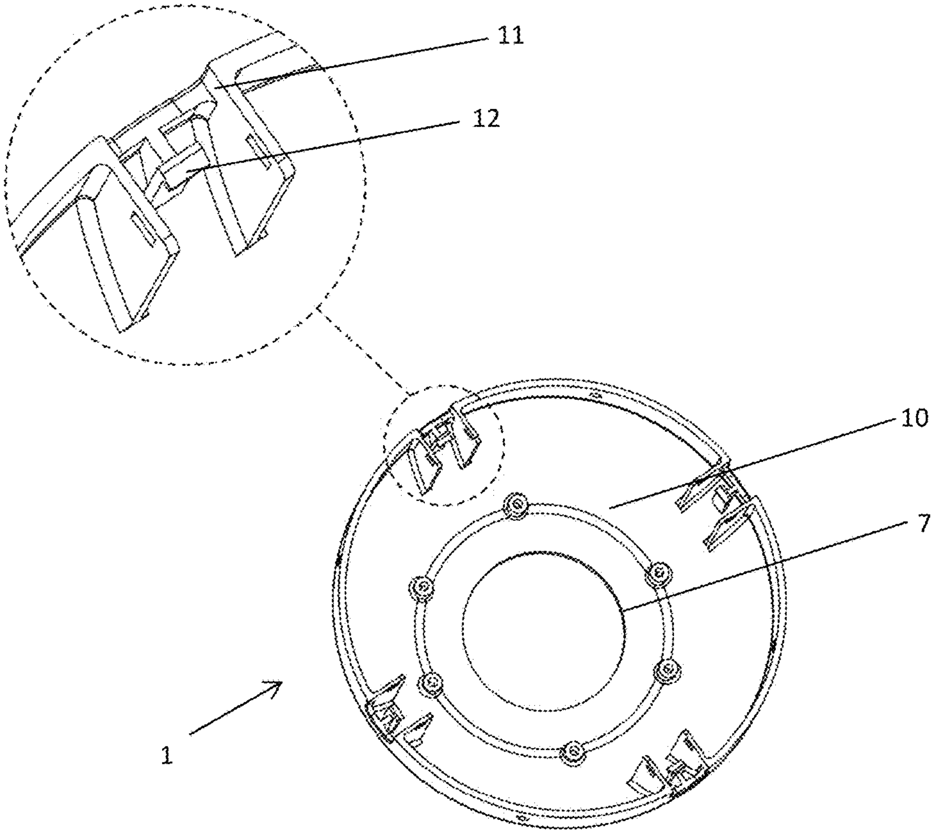
FIG. 5 is a schematic structural view of a mounting base of the disclosure.

The disclosure will be further explained in the following according to drawings and embodiments.

Embodiment 1

As shown in FIGS. 1 to 5, a spliced lighting fixture includes a lamp set module 101 and a fan module 102 which can be separated from each other. The lamp module 101 includes a mounting base 1 and at least two luminous modules 103 mounted on the mounting base 1, and each of the at least two luminous modules 103 includes an arc-shaped luminous frame unit 104 and a connecting rod 3 which extends from the luminous frame unit and can be fixedly connected to the mounting base 1. All of luminous frame units 104 can be matched and connected to form a whole annular luminous frame 105, all of connecting rods 3 are evenly distributed in a circumferential direction of the whole luminous frame 105, the mounting base 1 is arranged above a center of the whole luminous frame 105, and the luminous frame unit 104 includes a luminous frame unit bracket 2, an arcuate housing 4 and a luminous member (not shown). An arcuate housing 4 adapted to a length extension direction of the luminous frame unit bracket 2 is mounted at a lower surface of each of luminous frame unit brackets 2, and luminous members are arranged in the arcuate housing 4; The fan module includes a motor 5, and the motor 5 is supported at a center of a bottom groove of the mounting base 1. The screw 6 of the motor 5 passes through an opening 7 of the bottom groove of the mounting base 1, and fan blades 8 which can rotate coaxially with the screw 6 are provided on the screw 6, and the screw 6 faces a light emitting surface. A controller 9 which can be fixed to an upper surface of a motor 5 is provided above the motor 5, and both the motor 5 and the luminous frame unit are connected to the controller 9.

There are at least two schemes for arranging the fan blades 8 on the screw 6 of the motor. One is that radiuses of the fan blades 8 are larger than a radius of the whole luminous frame unit bracket 2, in which case the fan blades 8 need to be located below the arc-shaped housing 4; and the other is that the radiuses of the fan blades 8 are smaller than the radius of the whole luminous frame unit bracket 2, in which case the fan blade can be flush with the arc-shaped housing 5. Both schemes can be realized. Design of this embodiment mainly focuses on that the fan blades 8 of the fan module are located in a space enclosed by the luminous modules, that is, the radiuses of the fan blades 8 are smaller than the radius of the whole luminous frame unit bracket 2.

A number of the connecting rods 3 is N, and N is a positive integer greater than 1, the mounting base 1 is provided with N first clamping structures 11, and a terminal of each of the connecting rods 3 is respectively provided with a second clamping structure 13, and a respective first clamping structure 11 is buckled to the second clamping structure 13, so that the luminous frame unit bracket 2 is spliced on the mounting base 1.

The mounting base 1 is provided with a bottom groove 10, the first clamping structure 11 is provided at an upper end of a circumferential side wall of the bottom groove 10, the first clamping structure 11 includes a connecting groove for the second clamping structure 13 to be inserted from top to bottom, and at least one first clamping part 12 which extends upwards and can be inserted into and clamped with a self-contained jack of the second clamping structure 13 is arranged in the connecting groove.

The controller 9 can exemplarily adopt an 89C51 single chip microcomputer.

The arcuate housing 4 can exemplarily adopt a polycarbonate arcuate housing, and the mounting base 1 can exemplarily adopt a polycarbonate mounting base.

The arcuate housing 4 is long in its length extension direction, with a width of 12 to 18 mm, such as 14.5 mm, 15 mm, 15.5 mm, etc., and a thickness of 22 to 28 mm, such as 24 mm, 25 mm, 26 mm, etc.

Embodiment 2

Figure 6:
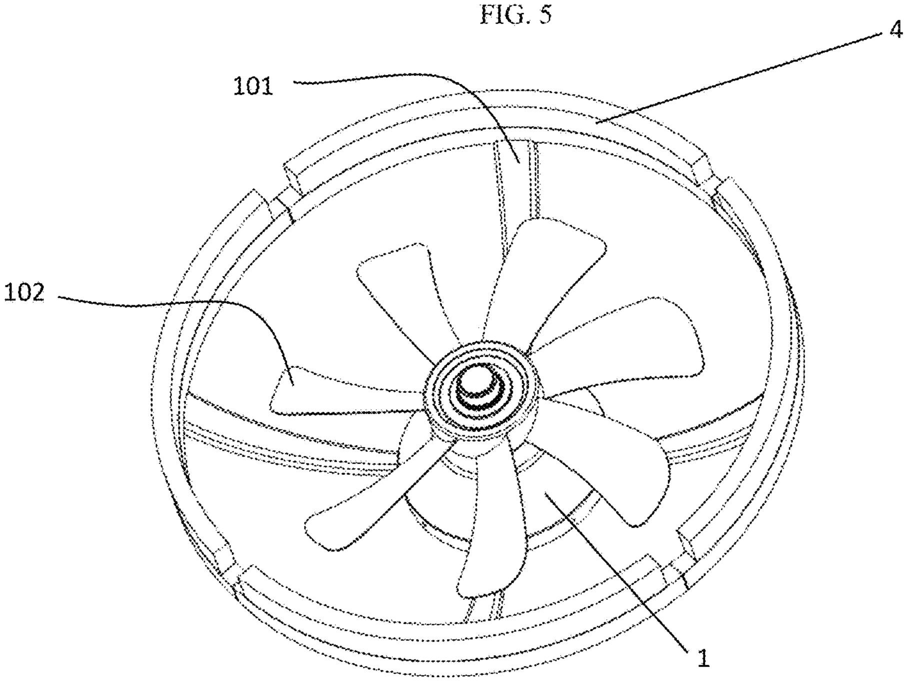
FIG. 6 is a schematic structural view of Embodiment 2 of the disclosure.

As shown in FIG. 6, on a basis of Embodiment 1, all of arcuate housings 4 have a same size and are evenly spaced and distributed on a same circumference, and a length of the arcuate housings 4 is designed to be smaller than a length of a lower surface of the luminous frame unit bracket 2.

The above described embodiments only express several implementations of the present disclosure, and their descriptions are more specific and detailed, but they cannot be constructed as limiting a scope of the present disclosure. It should be noted that, several modifications and improvements can be made by those of ordinary skilled in the art without departing from the concept of the present disclosure, which belong to the protection scope of the present disclosure. Therefore, the protection scope of this disclosure shall be subjected to appended claims.

What is claimed is:

1. A spliced lighting fixture, comprising a mounting base and at least two luminous modules, wherein each of the at least two luminous modules comprises a luminous frame unit and a connecting rod, the luminous frame unit being spliced on the mounting base through a terminal of the connecting rod;

wherein the connecting rod extends from the luminous frame unit and can be fixedly connected to the mounting base;

wherein the luminous frame unit comprises a luminous frame unit bracket, an arcuate housing which is matched and connected with the luminous frame unit bracket, and luminous members which are arranged in the arcuate housing and distributed at intervals, the arcuate housing is adapted to a length extension direction of the luminous frame unit bracket is mounted at a lower surface of each of luminous frame unit brackets, and luminous members are arranged in the arcuate housing;

wherein a number of the connecting rods is N, the mounting base is provided with N first clamping structures, and a terminal of each of the connecting rods is respectively provided with a second clamping structure, and a respective first clamping structure is buckled to the second clamping structure, so that the luminous frame unit is spliced on the mounting base;

wherein the mounting base is provided with a bottom groove, the first clamping structure is provided at an upper end of a circumferential side wall of the bottom groove, the first clamping structure comprises a connecting groove for the second clamping structure to be inserted from top to bottom, and at least one first clamping part which extends upwards and is inserted into and clamped with a self-contained jack of the second clamping structure is arranged in the connecting groove;

wherein a free end of the first clamping part is bent towards an opening of the mounting base.

2. The spliced lighting fixture according to claim 1, wherein all of luminous frame units are arranged in multi-segment arcs on a concentric circle.

3. The spliced lighting fixture according to claim 2, wherein all of the luminous frame units are connected end to end to form a circle, so that all of the luminous frame units form a whole annular luminous frame.

4. The spliced lighting fixture according to claim 2, wherein all of the luminous frame units have a same size and are evenly spaced and distributed on a same circumference.

5. The spliced lighting fixture according to claim 1, wherein the mounting base is further provided with a fan module, and fan blades of the fan module are located in a space enclosed by the luminous modules.

6. The spliced lighting fixture according to claim 5, wherein a motor of the fan module is built in and fixed at a center of the bottom groove of the mounting base, a screw faces a light-emitting surface, and the fan blades are installed on the screw of the motor.

* * * * *